(12) United States Patent
Licamele

(10) Patent No.: US 11,751,545 B2
(45) Date of Patent: Sep. 12, 2023

(54) INTEGRATED MULTI-TROPHIC FARMING PROCESS

(71) Applicant: Jason Licamele, Scottsdale, AZ (US)

(72) Inventor: Jason Licamele, Scottsdale, AZ (US)

( * ) Notice: Subject to any disclaimer, the term of this patent is extended or adjusted under 35 U.S.C. 154(b) by 49 days.

(21) Appl. No.: 14/695,933

(22) Filed: Apr. 24, 2015

(65) Prior Publication Data

US 2015/0305313 A1    Oct. 29, 2015

Related U.S. Application Data

(60) Provisional application No. 61/983,916, filed on Apr. 24, 2014.

(51) Int. Cl.
| | | |
|---|---|---|
| *A01K 63/04* | (2006.01) | |
| *A01G 31/00* | (2018.01) | |
| *A01K 61/00* | (2017.01) | |

(52) U.S. Cl.
CPC ............ *A01K 63/04* (2013.01); *A01G 31/00* (2013.01); *A01K 61/00* (2013.01); *Y02P 60/60* (2015.11)

(58) Field of Classification Search
CPC .... A01K 63/045; A01K 63/04; A01K 63/042; A01K 61/00; A01K 61/002; A01K 61/005; A01G 1/00; A01G 31/00
USPC ........................................................ 119/204
See application file for complete search history.

(56) References Cited

U.S. PATENT DOCUMENTS

| | | | | |
|---|---|---|---|---|
| 4,044,500 A | * | 8/1977 | Hitzman | ................ A01G 33/00 435/813 |
| 5,081,954 A | | 1/1992 | Monus | |
| 6,065,245 A | * | 5/2000 | Seawright | .............. A01G 31/00 119/268 |
| 6,881,338 B2 | * | 4/2005 | Austin | .................... C02F 3/327 210/903 |
| 7,029,586 B2 | * | 4/2006 | Austin | ..................... C02F 3/10 210/931 |

(Continued)

FOREIGN PATENT DOCUMENTS

| | | | |
|---|---|---|---|
| CN | 102381807 A | * | 3/2012 |
| CN | 104969907 A | * | 10/2015 |
| WO | 2014039904 | | 3/2014 |

OTHER PUBLICATIONS

Licamele, Jason, Integrated Multi-Trophic Farming Process, Patent Cooperation Treaty Application Serial No. PCT/US2016/29202, filed Apr. 16, 2015, International Search Report and Written Opinion dated Jul. 27, 2016.

*Primary Examiner* — Magdalena Topolski

(74) *Attorney, Agent, or Firm* — Schmeiser, Olsen & Watts LLP

(57) ABSTRACT

An integrated multi-trophic farming process and methods thereof that creates a linkage between aquaculture, hydroponics, agriculture, and algae production. The process and methods enable one skilled in the art of aquaculture, agriculture, hydroponics, and/or algae production to integrate aquaculture practices with their respective industry. The process and methods are applied to freshwater, brackish, and/or saltwater aquaculture production systems. The integrated multi-trophic farming process and methods enable one skilled in the art to produce fish and/or aquatic animals in conjunction with plant and/or algae crops with less consumption of water, feed, and/or fertilizers when compared to conventional open source farming practices such as but not limited to aquaculture, agriculture, and/or algae production.

9 Claims, 9 Drawing Sheets

(56) References Cited

U.S. PATENT DOCUMENTS

| | | | | |
|---|---|---|---|---|
| 8,291,640 | B2 * | 10/2012 | Kloas | A01K 61/10 47/62 R |
| 8,651,058 | B1 | 2/2014 | Pierce | |
| 8,677,942 | B2 * | 3/2014 | Bodlovich | A01K 67/0332 119/226 |
| 2003/0154926 | A1 | 8/2003 | Untermeyer et al. | |
| 2009/0301399 | A1 * | 12/2009 | Brown | A01K 63/065 47/17 |
| 2010/0236137 | A1 * | 9/2010 | Wu | C10L 1/19 554/8 |
| 2011/0041395 | A1 | 2/2011 | Newbold et al. | |
| 2015/0144069 | A1 * | 5/2015 | Dickerson | C05F 17/40 119/230 |
| 2015/0230439 | A1 * | 8/2015 | Harwood | A01K 63/045 119/227 |
| 2015/0305313 | A1 | 10/2015 | Licamele | |

\* cited by examiner

INTEGRATED MULTI-TROPHIC FARMING PROCESS

CROSS REFERENCE TO RELATED APPLICATIONS

This application claims priority to U.S. Provisional Patent Application to Licamele entitled "AN INTEGRATED MULTI-TROPHIC FARMING PROCESS," Ser. No. 61/983,916, filed Apr. 24, 2014, the disclosure of which is hereby incorporated entirely herein by reference.

BACKGROUND

1. Technical Field

The present invention relates to the integration of the fields of aquaculture, agriculture, hydroponics, aquaponics, and algae production. The present invention specifically relates to sustainable production of food and biomass, the process of handling and filtering the water within the system, and the linkage between the aquaculture, agriculture, hydroponics, aquaponics, and algae systems.

2. State of the Art

The production of food requires resources primarily consisting of water and nutrients. Farming practices utilize a significant amount of the world's water and nutrient resources. Open source farming practices such as aquaculture and agriculture produce effluent waste streams that lead to environmental issues. Agricultural practices over time can deplete the soil ecosystems to a point where crops will not grow as they once did. Aquaculture is the production of aquatic organisms in water, primarily consisting of fish, shrimp, and algae. The aquaculture industry is growing to meet the needs of future populations as wild stocks are at or past their maximum sustainable yields. Waste streams from aquaculture can be processed through filtration systems and used as fertilizers and soil amendments for agriculture. The aquaculture waste streams are also used as fertilizers for hydroponic systems, or what is known as aquaponics. Aquaponics has served as a tool for understanding mass balance in closed systems and the relationship between the aquaculture component and the plant component under a given set of filtration processes and/or cultivation methods. Aquaponics has primarily focused on fresh water production of plants. Multi-trophic aquaculture is the combination of growing more than one organism in the same system or process. This includes but is not limited to practices combining fish, invertebrates, algae and/or aquatic plants.

SUMMARY OF THE INVENTION

The described invention is an integrated multi-trophic farming process and methods thereof that creates a linkage between aquaculture, hydroponics, agriculture, and algae production. The process and methods described herein enable one skilled in the art of aquaculture, agriculture, hydroponics, and/or algae production to integrate aquaculture practices with their respective industry. The process and methods described within are applied to freshwater, brackish, and/or saltwater aquaculture production systems. The processes and methods described herein enable one skilled in the art to produce fish and/or aquatic animals in conjunction with plant and/or algae crops with less consumption of water, feed, and/or fertilizers when compared to conventional open source farming practices such as but not limited to aquaculture, agriculture, and/or algae production.

An integrated multi-trophic farming process and methods thereof is described for producing fish and/or aquatic animals in combination with the production of plant crops and/or algae. The embodiment of the invention is a process comprising (a) fish and/or aquatic animal production tank(s), (b.1, b.2, b.3, b.4) a series of filtration processes, a (c) hydroponic production system(s), (d) agricultural production system(s), and/or an (e) algae production system(s), and methods thereof to operate the process. The fish and/or aquatic animal component is comprised of a series of fish tanks that provide the primary macronutrients, micronutrients, organics and biological organisms to support the plant and/or algae component(s). The filtration process is comprised of a series of a (b.1) mechanical filtration unit, a (b.2) biological filtration unit, a (b.3) reservoir, and a (b.4) microparticulate filtration processes. The plant and/or algae production component is comprised of (c) hydroponics system(s), (d) soil agricultural farming system(s), and/or (e) algae system(s). The method of operation comprises the monitoring of nitrate concentration and/or nitrate-nitrogen concentration (referred to as nitrate herein), and iron concentration of the water leaving (b) the filtration process. The nitrate and iron concentrations are utilized as tracking variables to indicate when to add solutions to the system in order to meet the nutritional requirements of the plant crops and/or algae. The solution(s) are formulations based off of (1) the nutrient requirements of the plant and/or algae crops being produced within the process described herein, (2) the nutrient loading of the fish and/or aquatic animals described within the system herein, and (3) the levels of the tracking variables described herein (nitrate and iron). The addition of the solution(s) are added manually and/or automated via nutrient injectors. The solution(s) are added directly into the reservoir, directly into the (c, d, and/or e) plant and/or algae system(s), and/or in line to the delivery water stream for the (c, d) plant and/or (e) algae systems(s).

The processes and methods described herein enable one skilled in the art to produce fish and/or aquatic animals in conjunction with plant and/or algae crops with less consumption of water, feed, and/or fertilizers when compared to conventional open source farming practices such as but not limited to aquaculture, agriculture, and/or algae production. The invention enables on skilled in the art of aquaculture to produce an additional crop(s), conserve water, and reduce the environmental impact of the operation by redirecting the water through the integrated multi-trophic farming process and methods described within.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
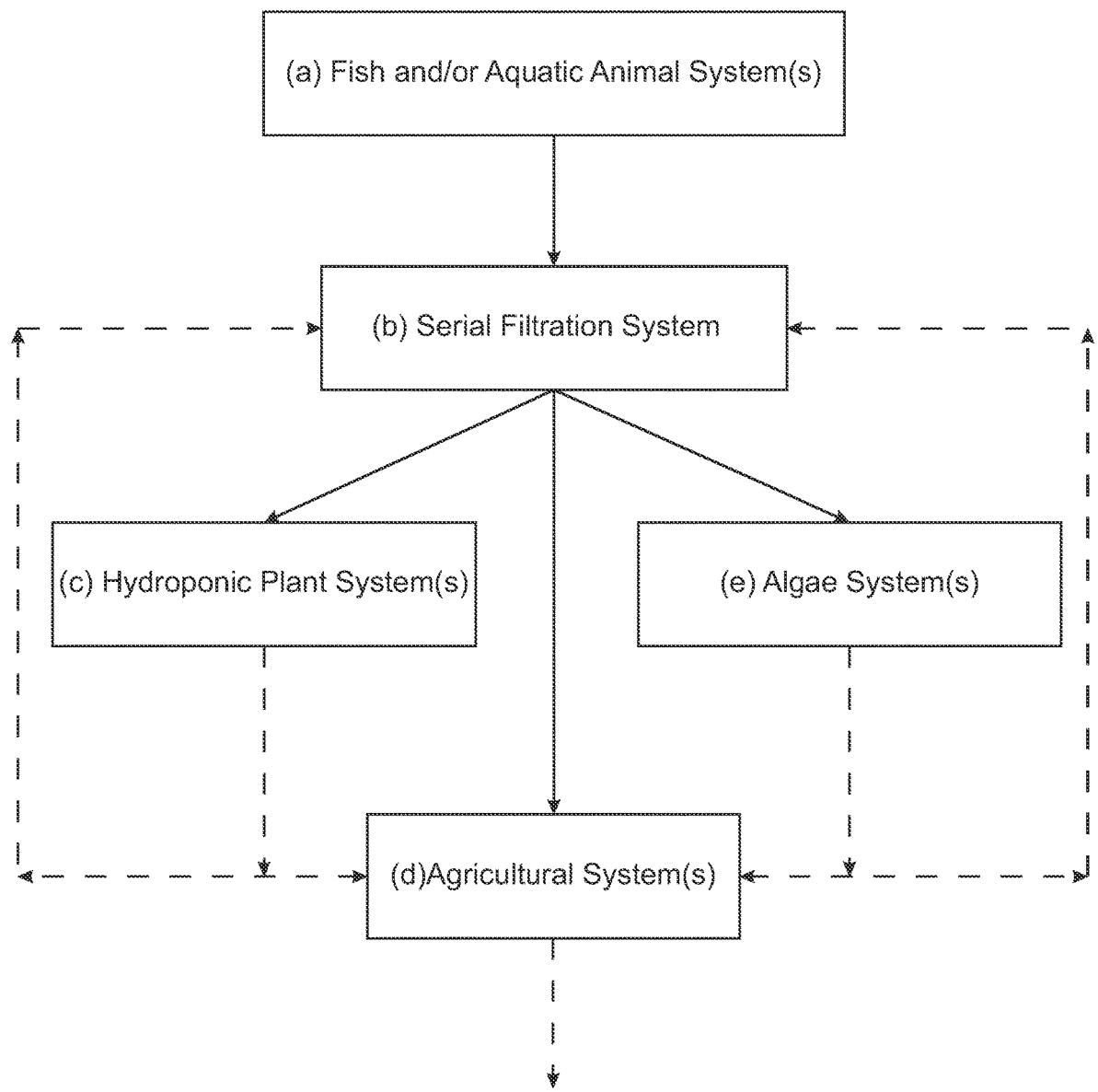
FIG. 1 is a flow chart of an integrated multi-trophic farming process.

An integrated multi-trophic farming process and methods thereof is described for producing fish and/or aquatic animals in combination with the production of plant crops and/or algae. The embodiment of the invention is a process comprising (a) fish and/or aquatic animal production tank(s), (b.1, b.2, b.3, b.4) a series of filtration processes, a (c) hydroponic production system(s), (d) agricultural production system(s), and/or an (e) algae production system(s), and methods thereof to operate the process. The fish and/or aquatic animal component is comprised of a series of fish tanks that provide the primary macronutrients, micronutrients, organics and biological organisms to support the plant and/or algae component(s). The filtration process is comprised of a series of a (b.1) mechanical filtration unit, a (b.2) biological filtration unit, a (b.3) reservoir, and a (b.4) micro-particulate filtration processes. The plant and/or algae production component is comprised of (c) greenhouse hydroponics system(s), (d) soil agricultural farming system(s), and/or (e) algae production system(s).

The method of operation comprises the monitoring of nitrate concentration and/or nitrate-nitrogen concentration (referred to as nitrate herein), and iron concentration of the water leaving (b) the filtration process. The nitrate and iron concentrations are utilized as tracking variables to indicate when to add solutions to the system in order to meet the nutritional requirements of the plant crops and/or algae. The solution(s) are formulations based off of (1) the nutrient requirements of the plant and/or algae crops being produced within the process described herein, (2) the nutrient loading of the fish and/or aquatic animals described within the system herein, and (3) the levels of the tracking variables described herein (nitrate and iron). The addition of the solution(s) are added manually and/or automated via nutrient injectors. The solution(s) are added directly into the reservoir, directly into the (c, d, and/or e) plant and/or algae system(s), and/or in line to the delivery water stream for the (c, d) plant and/or (e) algae systems(s).

The processes and methods described herein enable one skilled in the art to produce fish and/or aquatic animals in conjunction with plant and/or algae crops with less consumption of water, feed, and/or fertilizers when compared to conventional open source farming practices such as but not limited to aquaculture, agriculture, and/or algae production. The invention enables on skilled in the art of aquaculture to produce an additional crop(s), conserve water, and reduce the environmental impact of the operation by redirecting the water through the integrated multi-trophic farming process and methods described within.

The invention comprises a series of processes and methods of operation for an integrated multi-trophic farming system producing fish and/or aquatic animals in combination with the production of plant crops and/or algae. The embodiment of the invention is a process comprising (a) fish and/or aquatic animal production system(s), a series of (b.1, b.2, b.3, b.4) filtration processes, a (c) hydroponics system(s), (d) agricultural system(s), and/or an (e) algae production system(s), and methods thereof to operate said process. The methods utilize nitrate and iron concentration in the water of the (b) filtration effluent as tracking variables to indicate when and what solutions are added to adjust the water chemistry to provide proper plant and/or algae crop nutrition.

The components of the processes of the invention are as follows: (a) a fish and/or aquatic animal rearing system(s) that feeds a series of filtration processes comprised of (b.1) a mechanical filtration process to remove solids and particulate matter larger than 1,000 micrometers, (b.2) a biological filtration process to convert ammonia generated from the fish and/or aquatic animals into nitrate-nitrogen, (b.3) a reservoir for collecting water from the fish and/or aquatic animal system(s) and the plant and/or algae components of the system (c, d, and/or e), (b.4) a micro-filtration system(s) for removing fine particular matter smaller than 1,000 micrometers in size, (c) a hydroponic greenhouse system(s), and/or (d) an agricultural farm(s), and/or (e) an algae production system(s). The effluent water from the (c) hydroponics system(s) and/or the (e) algae system returns to the process at the (b.3) reservoir, and/or is utilized to irrigate (d) agricultural crops. The agricultural runoff from (d) the agricultural component(s) is collected and returns to the (b.3) reservoir, and/or is discharged to the environment after the soil retains the nutrients and particulate materials and plants assimilate the nutrients within the water. The water within said system is replenished with water from a well, municipality, wastewater treatment facility, golf course, rainwater, and/or any other means of obtaining a water source. The water, solids wastes collected in b.1, and fish and/or animal waste stream including the solid materials and/or the dissolved nutrients within the water are utilized to irrigate hydroponic greenhouse crops, and/or agricultural crops, amend agricultural soils, and/or algae cultivation systems.

Filtration Process

The filtration processes described herein are a serial combination of filtration processes individually practiced in the art of aquaculture, agriculture or hydroponics. The invention described herein enables one skilled in the art to utilize a variety of equipment currently available in the respective industries to link an aquaculture component to hydroponics, agriculture and/or algae production systems. The filtration components are sized in accordance with the total fish and/or aquatic animal biomass and daily feed input into (a) the fish and/or aquatic animal rearing system(s). The (c) hydroponic greenhouse system(s), and/or the (d) agriculture system, and/or (e) algae system (e) are scaled based on the nitrogenous waste output in the form of nitrate (and/or nitrate-nitrogen) from the (a) fish and/or aquatic animal rearing system(s) after it has been processed via the series of (b.1, b.2, b.3, b.4) filtration processes described in this invention. The (b.1) mechanical filtration component removes solids and particular matter larger than 1,000 micrometers. The (b.2) biological filtration component converts nitrogenous waste in the effluent discharge from the (b.1) mechanical filtration process from ammonia into nitrate-nitrogen via a nitrification process. The micro-filtration process removes particulate matter smaller than 1,000 micrometers. The water storage (b.3) reservoir collects the processed filtered water from the (a) fish and/or aquatic animal system(s) after it is processed through the (b.1) mechanical filter and (b.2) the biological filter. The (b.3) reservoir in a separate flow stream collects the effluent water from the (c) hydroponics system(s), (d) agricultural system(s), and/or the algae system(s). The (b.3) reservoir serves as an area to collect the filtered water from (a) fish and/or aquatic animal system(s) and the (c) hydroponics system(s), (e) agricultural systems, and/or (e) algae systems. The (b.3) reservoir serves an area to add nutrients and/or chemicals to condition the water for application into the described systems (c, d, e, and/or any combination thereof). The delivery of the nutrients and the supplements may be added manually and/or via an automated nutrient delivery system into the (b.3) reservoir and/or into the flow stream of water delivered to the (c) hydroponics system(s), (d) agriculture system(s), and/or the algae system(s).

Methods

The method described herein, and shown in FIGS. 1-9, provides a means to manage the water chemistry of the integrated multi-trophic farming process described herein, as to maintain fish and/or aquatic animal as well as plant and/or algae crop yield and quality. The nitrate-nitrogen and/or nitrate concentration, and iron concentration of the water in the system are utilized as tracking variables to determine the amount and/or concentration of nutrient(s) and supplement(s) mixtures to be added. Nutrients and supplements are added as needed manually and/or via nutrient injection depending on the concentration of nitrate and iron of the water in the system, plant and/or algae nutritional requirements, life stage of the plant and/or algae crop, and the production method of the plant and/or algae crop. Nutrient(s) and supplement(s) mixtures are added to the system at a rate determined by the nitrate concentration of the water within the system generated from the (b) filtration process described herein, and the iron concentration of the water within the system. The combination of the water and nutrients within the described system and the addition of the solution(s) provide the necessary fertilizers to meet the nutritional requirements of the plant and/or algae crop. The pH of the system is maintained by adding solutions of an acid and/or base manually to the (b.3) reservoir, and/or via automated injection into the (b.3) reservoir, (c) hydroponics greenhouse, (d) agriculture system(s), and/or (e) algae production system(s). The nitrate concentration and the iron concentration in the water of the integrated multi-trophic farming system determine the concentration and proportion of the nutrient(s) and supplement(s) added to the solution and/or solutions. The solutions are comprised of some and/or all macronutrients, micronutrients, trace minerals, organics and biologicals for plant and/or algae growth. A single solution and/or a variety of different solutions are used separately, in tandem, and/or in sequence.

FIG. 1. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The water from the agricultural component is released to the environment, used as a soil amendment, and/or is collected in a larger waterway for reuse back into the system. The (c) hydroponics component is a closed loop system, and the (e) algae component is a closed loop and or semi-closed loop system.

Figure 2:
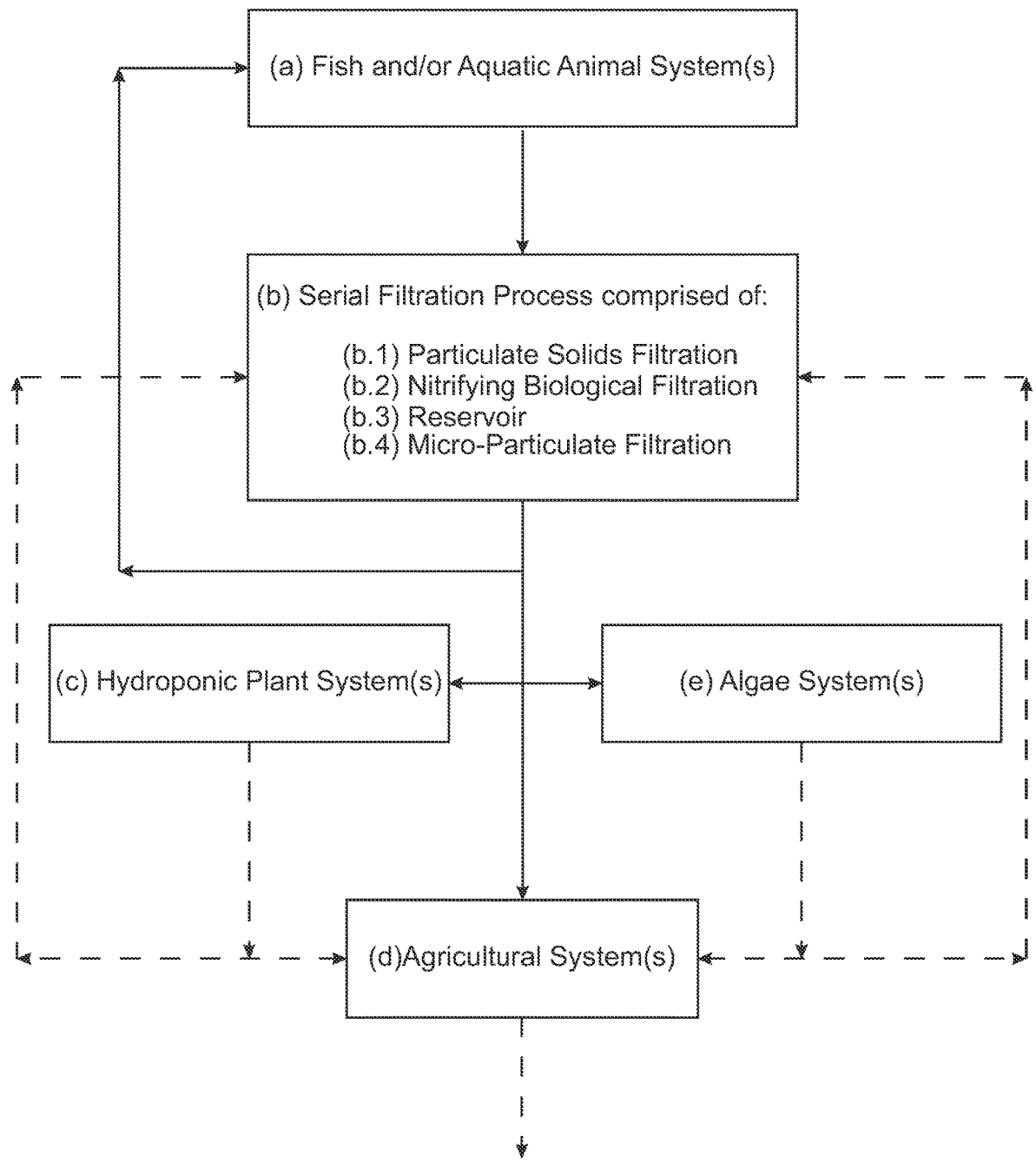
FIG. 2 is a flow chart of a serial filtration process.

FIG. 2. General description of the serial filtration process described herein. The solid lines represent pumped water delivered to the respective systems (a, b, c, d, and/or e). The dashed lines represent the gravity flow from the respective systems (a, b, c, d, and/or e). The water returning from the (c) hydroponics system and/or the algae system bypasses the (b.1) particulate solids filtration system and the (b.2) nitrifying biological filter and enters the (b.3) reservoir directly where it mixes with the rest of the water in the system.

Figure 3:
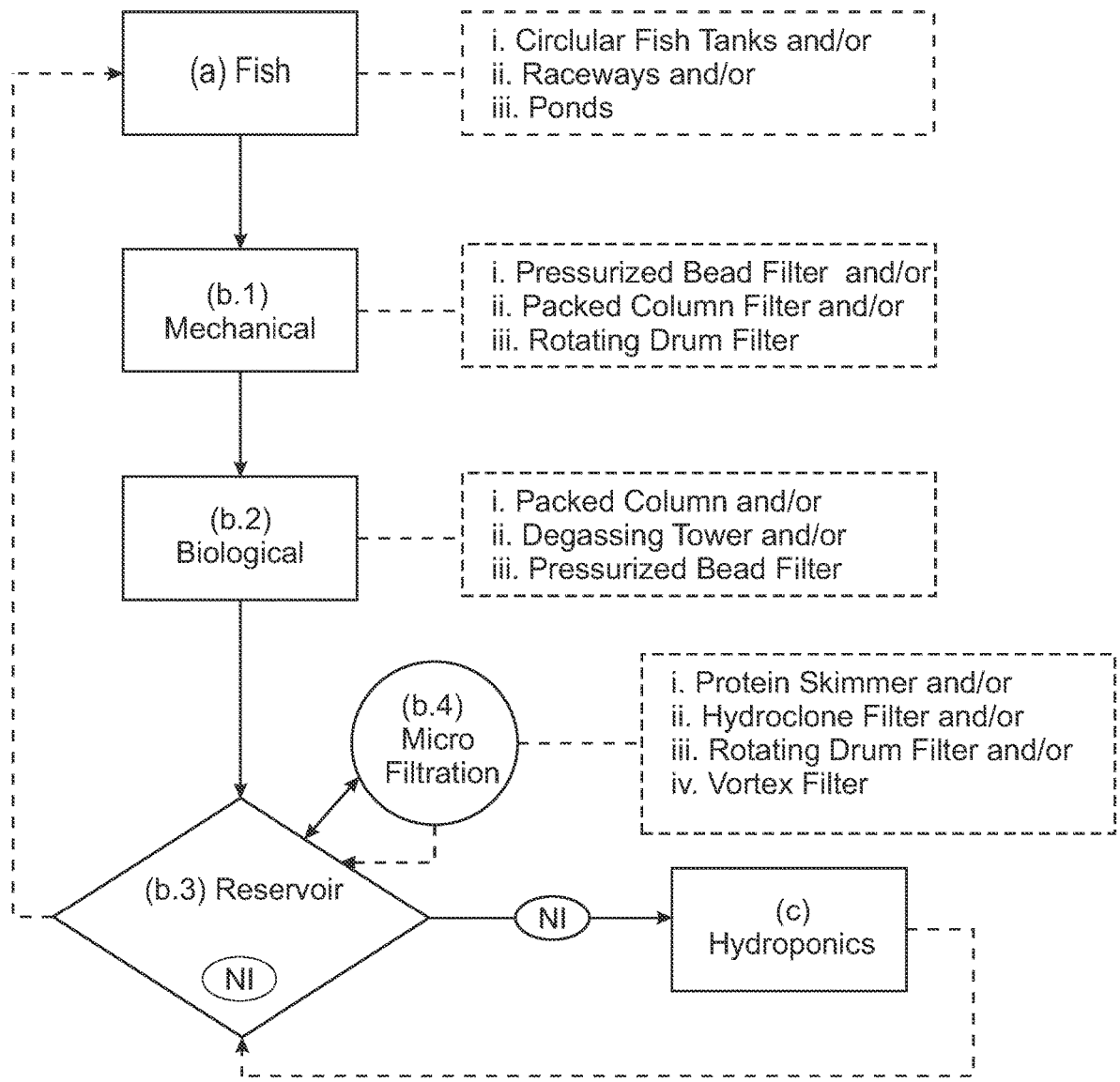
FIG. 3 is a flow chart of an integrated multi-trophic farming process.

FIG. 3. General flow chart of the integrated multi-trophic farming process described herein. The solid lines represent pumped water delivered to the respective systems (a, b, c, d, and/or e). The dashed lines represent the gravity flow from the respective systems (a, b, c, d, e, and/or any combination thereof). The term "NI" represents location to inject the solutions. In the present embodiment of the invention the micro-filtration is attached to the (b.3) reservoir. The preferred method of filtration is described in the figure and the claims herein. In the present embodiment of the invention described in this figure a (c) hydroponics system is integrated with the (a) fish and/or animal system and the (b) serial filtration system.

Figure 4:
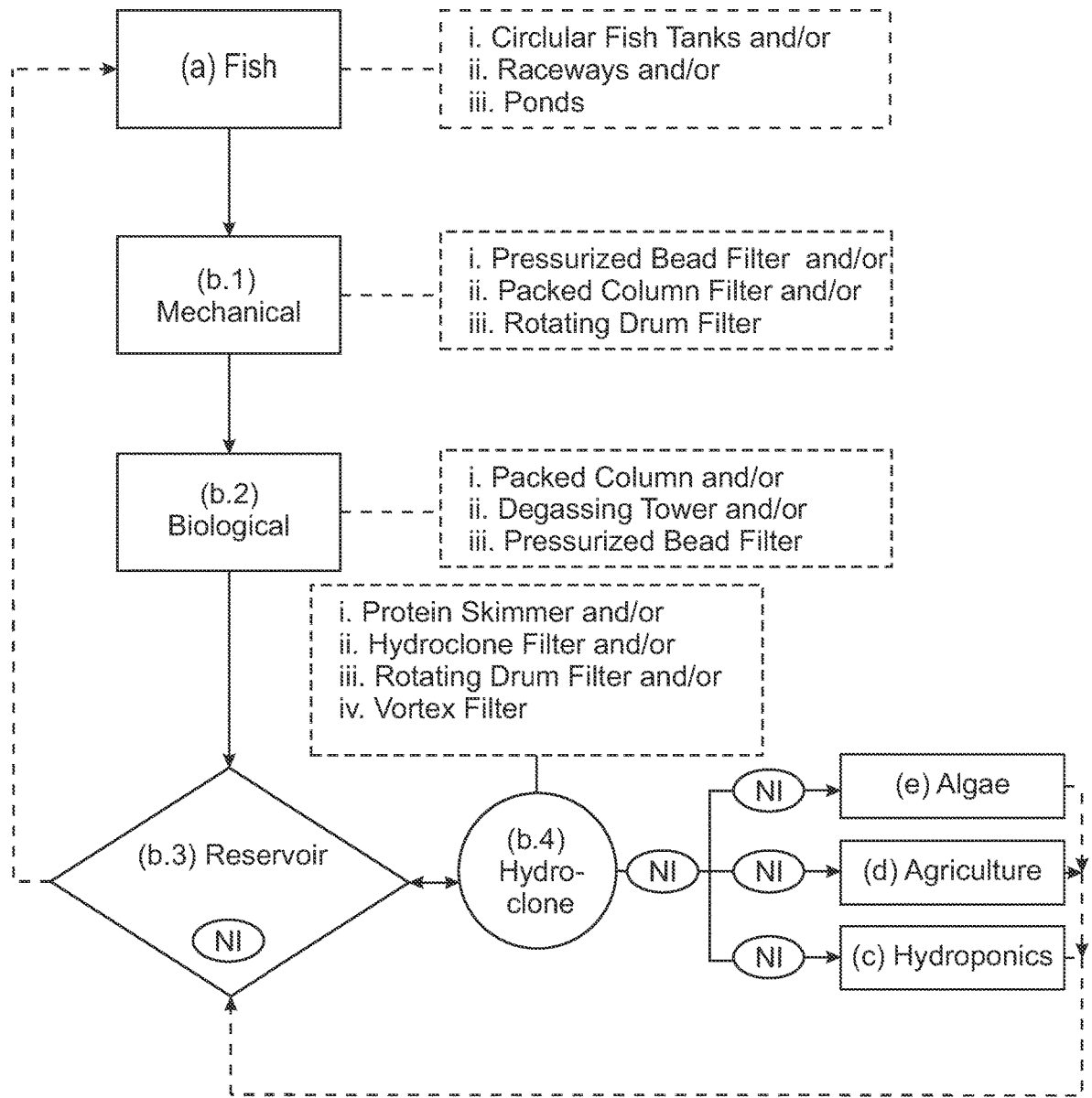
FIG. 4 is a flow chart of an integrated multi-trophic farming process.

FIG. 4. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The term "NI" represents location to inject the nutrient solutions. In the present embodiment of the invention the micro-filtration is attached in line to the water distribution pipes feeding a (c) hydroponic system(s), (d) agricultural system(s), (e) algae system, and/or any combination thereof. The preferred method of filtration is described in the figure and the claims herein.

Figure 5:
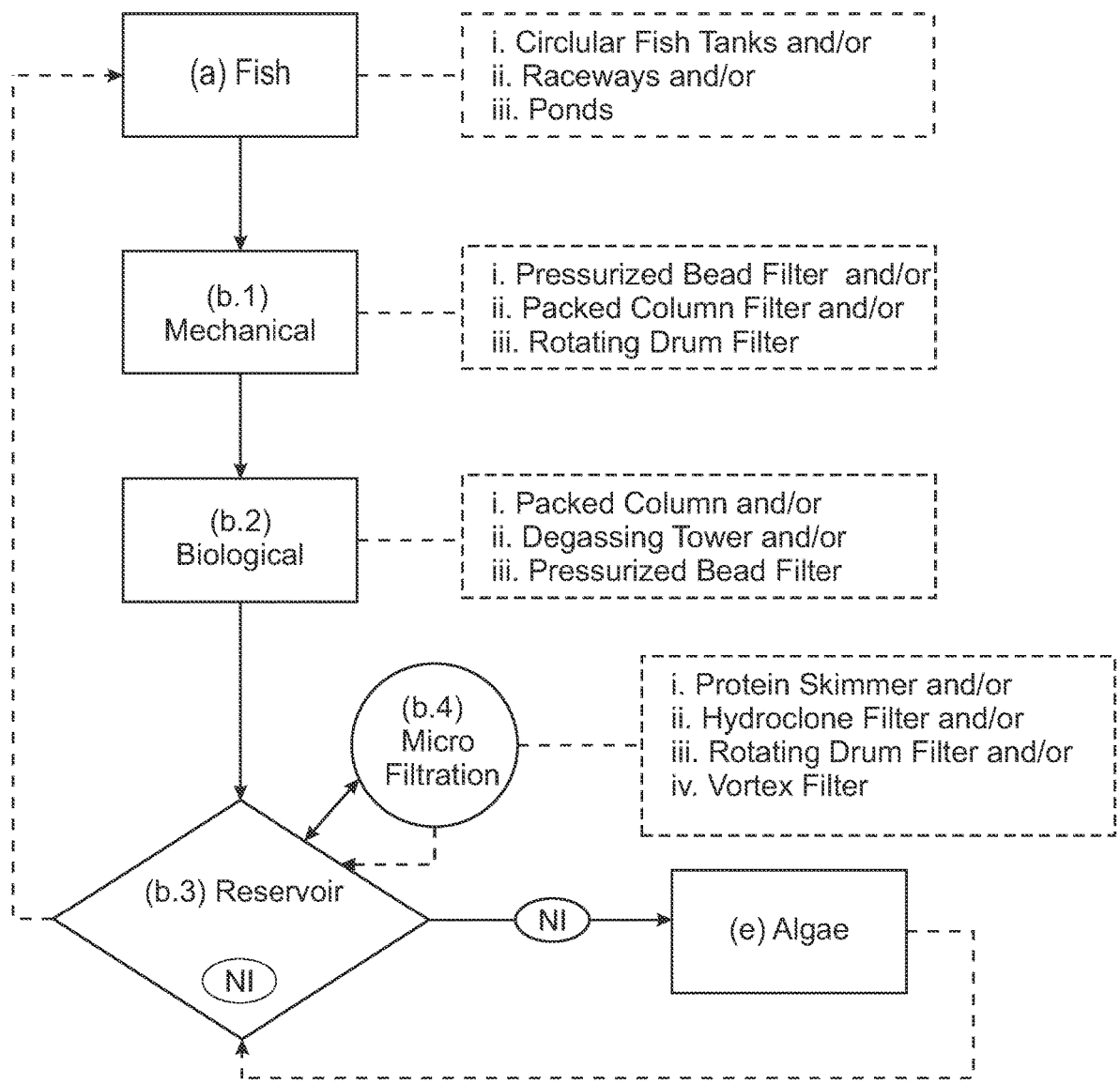
FIG. 5 is a flow chart of an integrated multi-trophic farming process.

FIG. 5. General flow chart of the integrated multi-trophic farming process described herein. The solid lines represent pumped water delivered to the respective systems (a, b, c, d, and/or e). The dashed lines represent the gravity flow from the respective systems (a, b, c, d, e, and/or any combination thereof). The term "NI" represents location to inject the solutions. In the present embodiment of the invention the micro-filtration is attached to the (b.3) reservoir. The preferred method of filtration is described in the figure and the claims herein. In the present embodiment of the invention described in this figure a (e) algae system is integrated with the (a) fish and/or animal system and the (b) serial filtration system.

Figure 6:
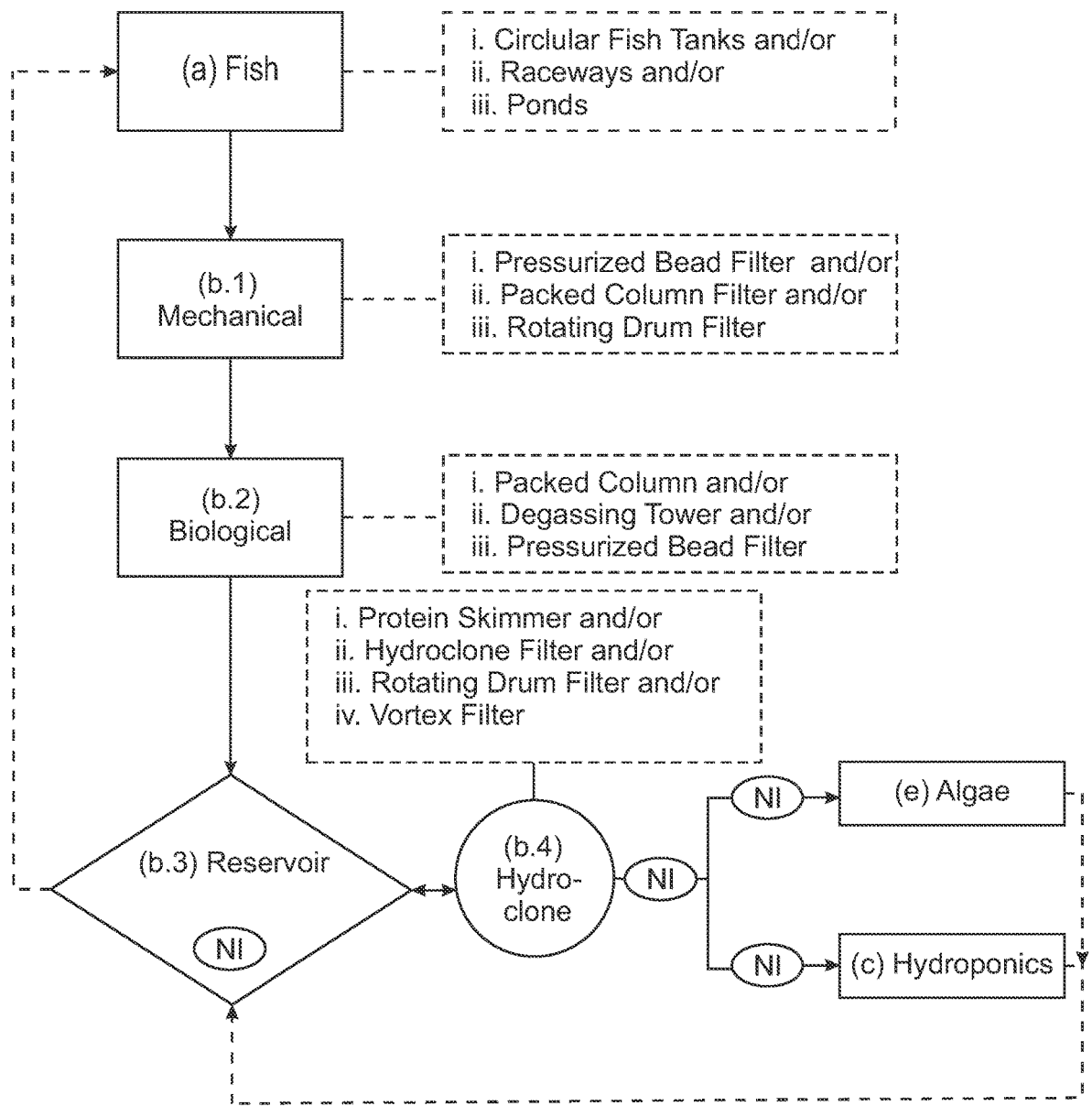
FIG. 6 is a flow chart of an integrated multi-trophic farming process.

FIG. 6. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The term "NI" represents location to inject the nutrient solutions. In the present embodiment of the invention the micro-filtration is attached in line to the water distribution pipes feeding a (c) hydroponic system(s), the (e) algae system(s), and/or any combination of system(s) herein. The preferred method of filtration is described in the figure and the claims herein.

Figure 7:
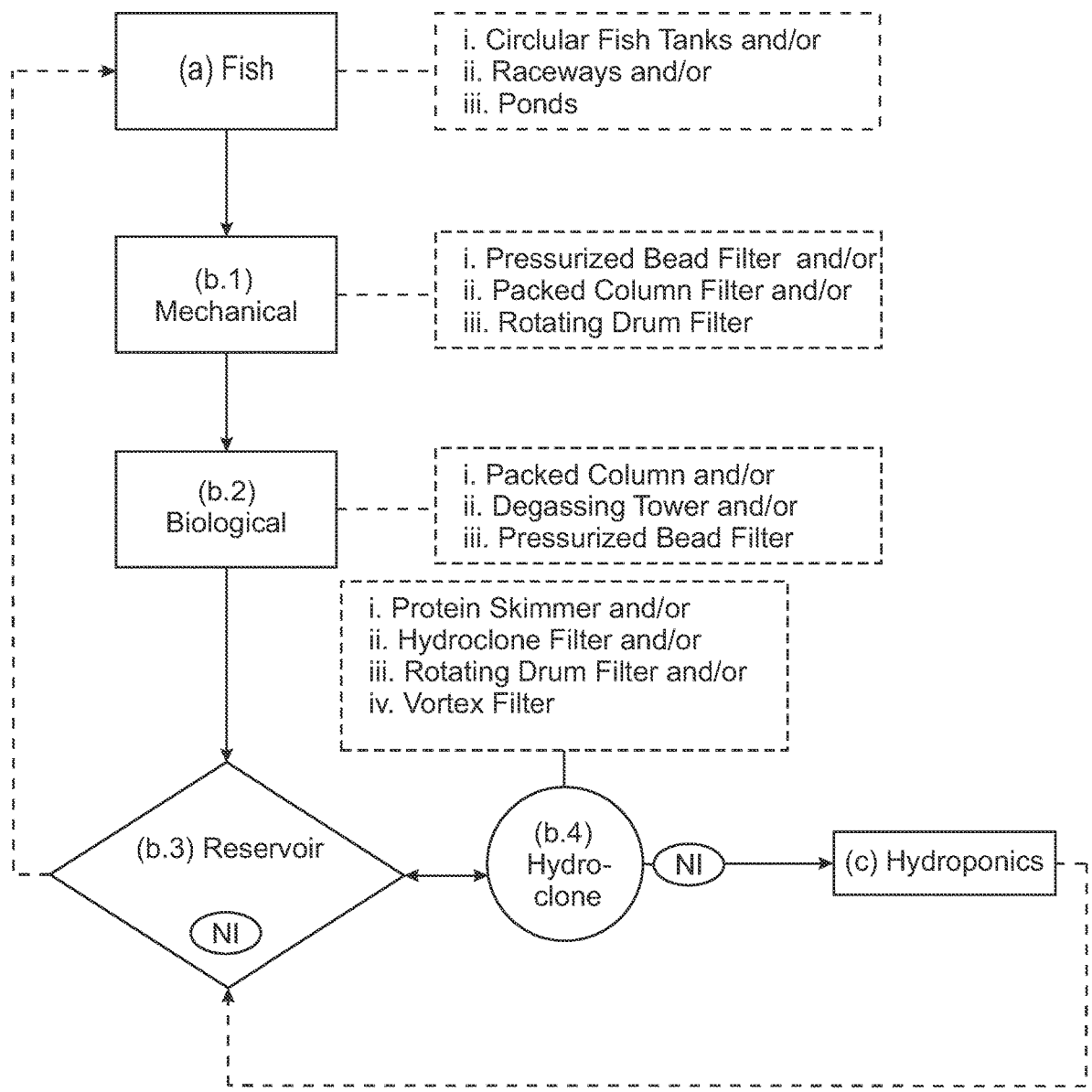
FIG. 7 is a flow chart of an integrated multi-trophic farming process.

FIG. 7. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The term "NI" represents location to inject the nutrient solutions. In the present embodiment of the invention the micro-filtration is attached in line to the water distribution pipes feeding an (c) hydroponic system(s). The preferred method of filtration is described in the figure and the claims herein.

Figure 8:
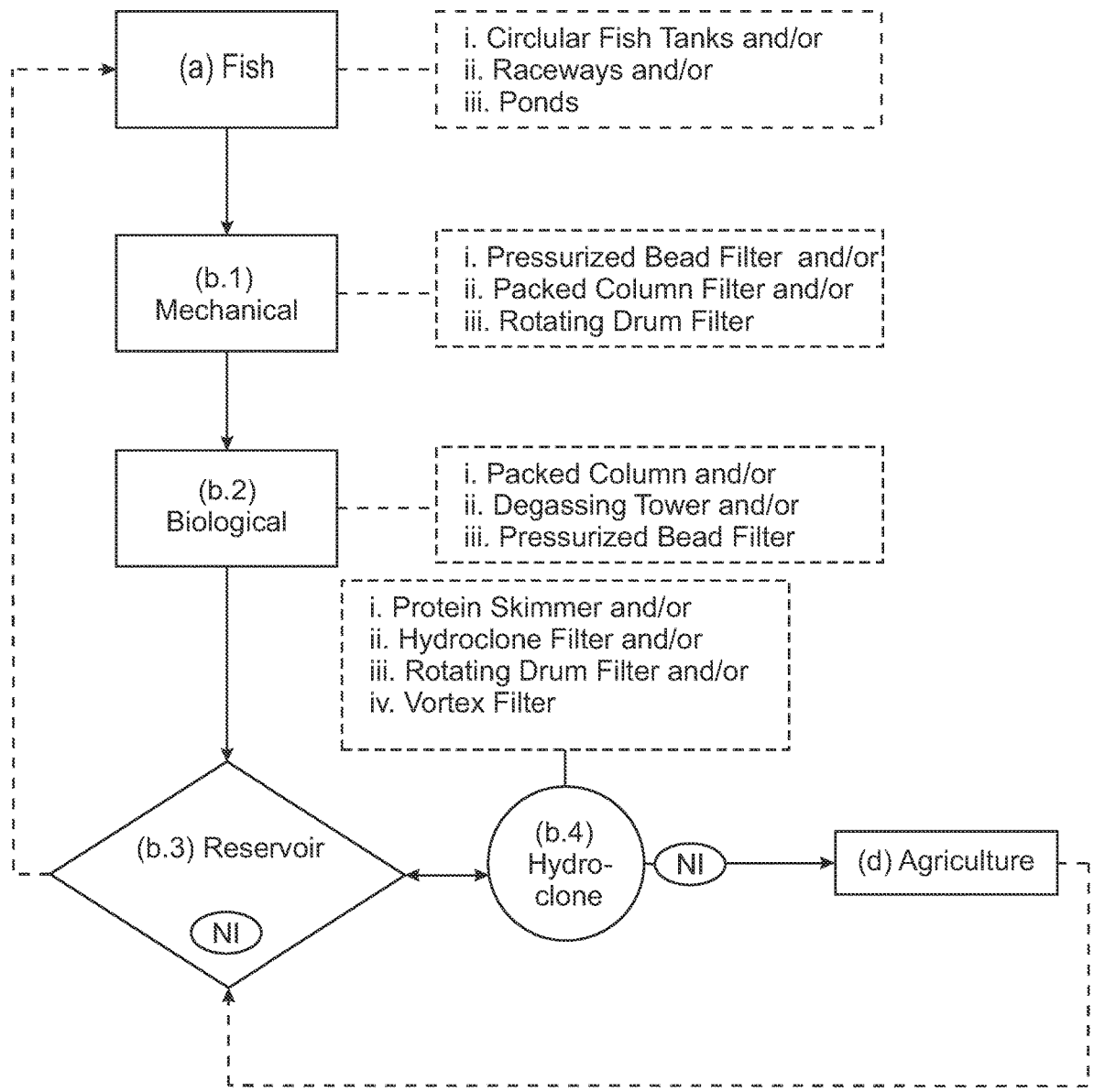
FIG. 8 is a flow chart of an integrated multi-trophic farming process.

FIG. 8. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The term "NI"

represents location to inject the nutrient solutions. In the present embodiment of the invention the micro-filtration is attached in line to the water distribution pipes feeding an (d) agricultural system(s). The preferred method of filtration is described in the figure and the claims herein.

Figure 9:
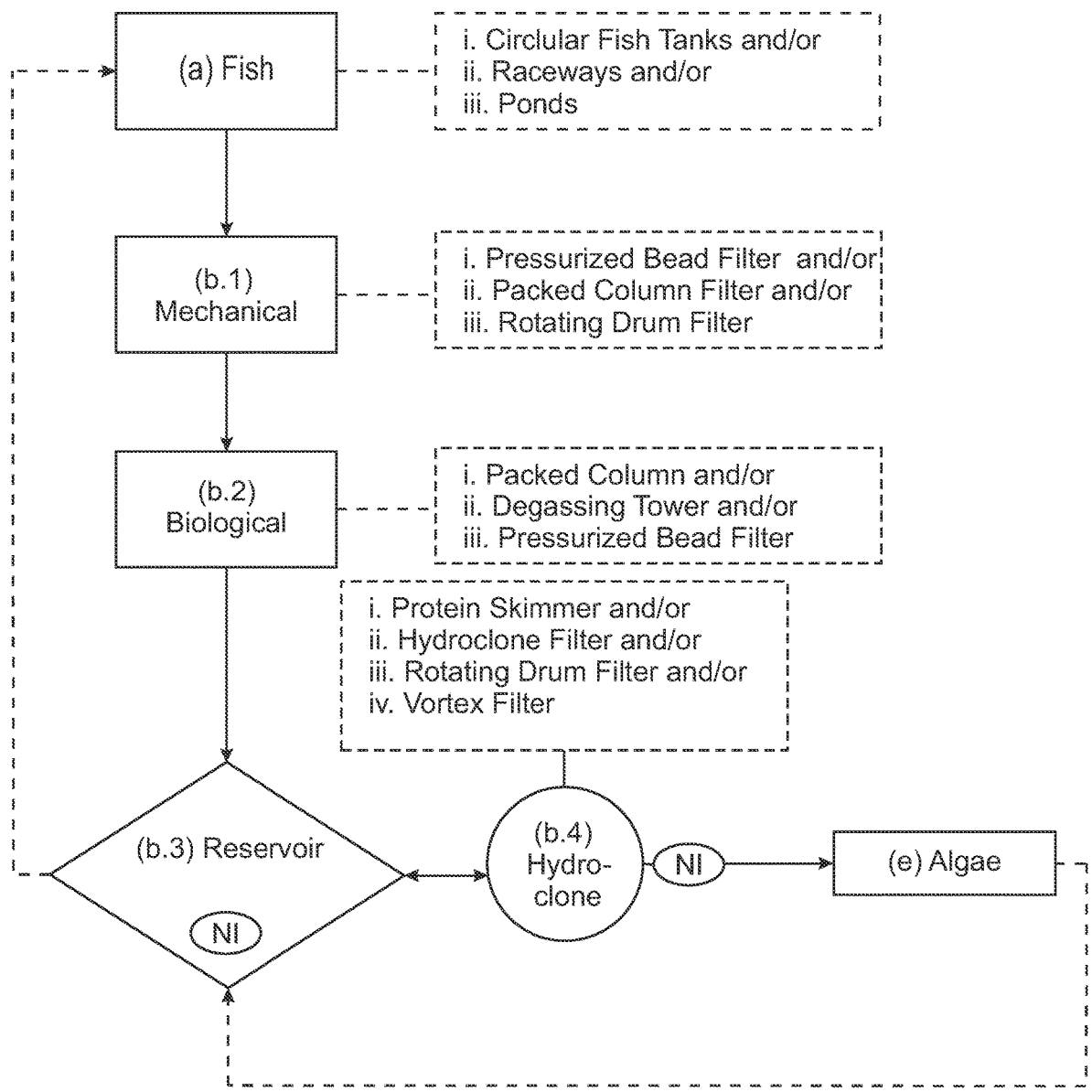
FIG. 9 is a flow chart of an integrated multi-trophic farming process.

FIG. 9. General flow chart of the integrated multi-trophic farming process described herein. The solid lines represent pumped water delivered to the respective systems (a, b, c, d, and/or e). The dashed lines represent the gravity flow from the respective systems (a, b, c, d, and/or e). The term "NI" represents location to inject the nutrient solutions. In the present embodiment of the invention the micro-filtration is attached in line to the water distribution pipes feeding an (e) algae system(s). The preferred method of filtration is described in the figure and the claims herein.

Definitions

Fish and Aquatic animal system(s)—the production of aquatic organisms including but not limited to fish, shrimp, prawns, clams, mussels, sea cucumbers, and/or any other aquatic animal or combination of aquatic animals cultivated in captivity.

Mechanical Filtration system(s)—filtration systems that commonly remove particulate matter larger than 1,000 micrometers.

Biological Filtration system(s)—filtration systems that converts nitrogenous wastes from fish and/or aquatic animal systems in the form of ammonia to nitrate.

Nitrate—the nitrogenous compound assimilated by plants and/or algae including. Nitrate refers to nitrate and/or nitrate nitrogen.

Micron Filtration system(s)—filtration systems that remove particulate matter and solids less than 1,000 micrometers Hydroponic system(s)—the production of plants in a soilless medium including but not limited to floating bed, nutrient film technique, aeroponics, drip irrigation, and/or various hydroponic growing techniques commonly practiced in the art.

Agricultural system(s)—the production of plants in soil including but not limited to vegetables, fruits, trees, commodities, coffee, grapes, olives, and/or any crops or combinations of crops grown in soil.

Plant system(s)—any plant material regardless of the cultivation method.

Algae system(s)—the production system(s) and/or harvesting system(s) of algae including but not limited to microalgae, macroalgae, and or any combination thereof.

Soilition(s)—refers to the nutrient solution mixes and supplements added based off the plant nutrient requirements and the nutrients in the effluent water discharged from the filtration process.

Embodiments include an integrated multi-trophic farming process comprised of: a) a fish and/or aquatic animal rearing system; b) a series of filtration comprising: 1) a mechanical filter capable of removing particulate matter equal to or larger than 1,000 micrometers; 2) a biological filter; 3) a reservoir; 4) a micron filter capable of removing particles equal to or less than 1,000 micrometers; c) a hydroponic system(s); d) an agricultural system(s); and e) an algae production and/or harvesting system.

The fish and/or aquatic animal rearing system is comprised of: a) a circular fish tank; b) a raceway; c) an acre and/or hectare pond; d) a cage submersed in: 1) a circular fish tank; 2) a raceway; 3) an acre and/or hectare pond; 4) a lake; 5) an estuary or coastal lagoon; and 6) an ocean waterway.

In some embodiments, the fish and/or aquatic animal system(s) contains fish. In other embodiments the fish and/or aquatic animal system(s) contains fish. In embodiments the fish and/or aquatic animal system(s) contains fish and shrimp. Further, in other embodiments, the fish and/or aquatic animal system(s) contains fish, shrimp and/or any type of aquatic animals.

In some embodiments of the integrated multi-trophic farming system the fish and/or aquatic animal system(s) contains two sections: a) a top portion wherein in the fish reside; and b) a bottom portion wherein the shrimp reside.

In embodiments, the integrated multi-trophic farming system includes shrimp added to: a) the (a) fish and/or aquatic animal system(s); b) the (b.3) reservoir; c) the (c) hydroponic growing bed; d) the (e) algae system(s); and e) and/or any combination thereof.

In embodiments, the mechanical filtration process is comprised of: a) a bead filter; b) a sand filter; c) a rotating drum filter; d) a fluidized bed filter; e) a packed column filter; f) a tank and/or tray filter; g) a cartridge filter, h) a screen filter; i) a gravel and/or under gravel filter; j) a diatomaceous earth filter; k) a vortex filter; l) a hydroclone filter; m) a cyclone filter; n) a protein skimmer and/or foam fractionation filter; and o) and/or any other filtration and/or combination thereof in series and/or parallel commonly practiced in the art of solids removal.

In embodiments, the series of mechanical filtration is comprised of: a) a filtration component capable of removing particles larger than 10,000 micrometers from water; b) a filtration component capable of removing particles larger than 5,000 micrometers from water; c) a filtration component capable of removing particles larger than 1,000 micrometers from water; and d) and/or any combinations of filtration components in series and/or parallel thereof capable of sequentially removing particles. The mechanical filtration may be arranged in series. The mechanical filtration may be arranged in parallel.

In embodiments, the mechanical filter and/or mechanical portion of the packed column filter is comprised of: a) filtration beads; b) filtration floss; c) filtration mesh netting; d) sand; e) carbon granules and/or filter pads; f) zeolite; g) gravel; h) earthstone; i) diatomaceous earth; j) crushed shells; k) crushed limestone; l) and/or any porous filtration material commonly practiced in the art of solids removal.

In embodiments, the mechanical filter is a bead filter comprised of: a) filtration beads of one millimeter diameter and or length; b) filtration beads of one millimeter diameter and or width; c) filtration beads of one centimeter diameter and/or length; d) filtration beads of one centimeter diameter and/or width; e) a mixture of bead sizes and shapes; f) and/or filtration beads of any size commonly practiced in the art of solids removal filtration.

In embodiments, the mechanical filter is a packed column comprised of: a) filtration beads; b) filtration floss; c) filtration mesh and/or netting materials; d) fabrics and/or porous woven materials; e) coconut coir matting; f) zeolite; g) Earthstone; h) diatomaceous earth; i) crushed shells; j) crushed limestone; k) and/or any porous filtration material capable of removing particulate matter commonly practiced in the art of solids removal filtration.

In embodiments, the mechanical filter is a rotating drum filter comprised of: a) a mesh screen of 10,000 micrometers; b) a mesh screen of 8,000 micrometers; c) a mesh screen of 5,000 micrometers; d) a mesh screen of 2,000 micrometers;

e) a mesh screen of 1,000 micrometers; f) and/or any drum filtration screening and/or any combination thereof commonly practiced in the art of solids removal filtration.

In embodiments, the mechanical filter system is a series of rotating drum filters comprised of: a) a mesh screen of 10,000 micrometers; b) a mesh screen of 8,000 micrometers; c) a mesh screen of 5,000 micrometers; d) a mesh screen of 2,000 micrometers; e) a mesh screen of 1,000 micrometers; f) and/or any drum filtration screening and/or any combination thereof commonly practiced in the art of solids removal filtration In embodiments, biological filtration system is comprised of: a) a packed column comprising: 1) plastic biological media beads; 2) plastic biological media netting; 3) plastic biological media matting; 4) zeolite; 5) gravel; 6) and/or any material commonly practiced in the art of biological filtration system; b) a packed column comprising: 1) a mechanical filter of claim 1.b.1 on the upper portion; 2) a biological filter of claim 1.b.2 underneath the mechanical portion; c) a trickling tower comprised of: 1) plastic biological media beads; 2) plastic biological media netting; 3) plastic biological media matting; 4) zeolite; 5) gravel; 6) and/or any material commonly practiced in the art of biological filtration systems; d) a fluidized bed filter; e) a pressurize bead filter; f) sand filter; g) rotating drum filter; h) a canister filter comprising: 1) plastic biological media beads; 2) plastic biological media netting; 3) plastic biological media matting; 4) zeolite; 5) gravel; 6) and/or any material commonly practiced in the art of biological filtration systems In embodiments, the reservoir is comprised of: a) a settling trough; b) a raceway; c) a tank; d) a concrete raceway, tank, and/or pond; e) a pond lined with a material to prevent the water from contacting the earth; f) an earthen pond; g) and/or any methods of holding water commonly practiced in the art of aquaculture, agriculture, hydroponics, algae culture and/or waste water treatment. The (b.3) reservoir may be buried in the ground. The reservoir may be placed on the ground.

In embodiments, the micron filter is comprised of: a) a bead filter; b) a sand filter; c) a rotating drum filter; d) a fluidized bed filter; e) a packed column filter; f) a cartridge filter; g) a screen filter; h) a gravel and/or under gravel filter; i) a clarifier; j) a radial flow separator; k) a vortex filter; l) a hydroclone filter; m) a cyclone filter; n) a centrifugation process to separate particles; o) a protein skimmer and/or foam fractionation unit; p) and/or any other filtration commonly practiced in the art of solids removal capable of removing particulate matter smaller than 1,000 micrometers. The micron filter may be a series of micron filters and/or any combination thereof. The micron filter may be a screen filter and/or a series of screen filters. The micron filter may be a rotating drum filter and/or a series of rotating drum filters. The micron filter may be a protein skimmer and/or foam fractionation unit. The micron filter may be a series of protein skimmers and/or foam fractionation units. The integrated multi-trophic farming system may be injected into the protein skimmer and/or foam fractionation unit. Ozone may be injected into the (b.3) reservoir. Ozone may be applied in the (b.3) reservoir and the (b.4) micron filter is a protein skimmer and/or foam fractionation unit. Ozone may be applied in the (b.3) reservoir and the micron filter is a series of protein skimmers and/or foam fractionation units.

In embodiments, the micron filter is a hydroclone filter and/or a series of hydroclone filters: a) filtering the water from the (b.3) reservoir prior to distribution to the fish and/or aquatic animal system(s) and the (c, d) plant/and or (e) algae systems; b) filtering the water from the (b.3) reservoir prior to distribution to the (c, d) plant/and or (e) algae systems; c) filtering the water from the (b.3) at the location prior to entering the (c) hydroponics system(s), (d) agriculture system(s), and/or algae system(s). The micron filter may be a screen filter: a) filtering the water from the (b.3) reservoir prior to distribution to the fish and/or aquatic animal system(s) and the (c, d) plant/and or (e) algae systems; b) filtering the water from the (b.3) reservoir prior to distribution to the (c, d) plant/and or (e) algae systems; c) filtering the water from the (b.3) at the location prior to entering the (c) hydroponics system(s), (d) agriculture system(s), and/or algae system(s). The micron filter may be a cyclone filter and/or a series of cyclone filters. The micron filter may be a vortex filter and/or series of vortex filters.

In embodiments, the water is distributed with: a) a pump; b) a plurality of pumps; c) an air-lift mechanism driven by: 1) a regenerative blower; 2) an air compressor; d) a pump comprised of a venturi and/or gas supply mechanism supplied with: 1) air; 2) oxygen; 3) ozone; 4) and/or any combination thereof. The distribution of water flow may be controlled by a valve and/or electronic valve. The distribution of water flow to the plant and/or algae system(s) may be reduced and the water flow to the fish and/or aquatic animal system(s) may be increased proportionately. The valve distributing water flow to the plant and/or algae system(s) and the valve distributing water flow to the hydroponic system(s), agricultural system(s), and/or algae system(s) are controlled.

In embodiments, the distribution of water from the reservoir: a) is controlled by a valve; b) is controlled by a solenoid valve; c) is distributed at equal flow rates to the fish and/or aquatic animal system(s) and the hydroponic system(s), agricultural system(s, and/or algae system(s); d) is distributed to the fish and/or aquatic animal system(s) at a faster flow rate proportional to the reduction in flow rate to the hydroponic system(s), agricultural system(s, and/or algae system(s); e) is distributed to the fish and/or aquatic animal system(s) at a slower flow rate proportional to the increase in flow rate to the hydroponic system(s), agricultural system(s), and/or algae system(s); f) is distributed to the fish and/or aquatic animal system(s) which operate independently from the hydroponic system(s), agricultural system(s), and/or algae system(s) by closing a valve.

In embodiments, the fish and/or aquatic animal is: a) a fish including but not limited to a tilapia, perch, trout, cobia, barramundi, catfish, snapper, grouper, snook, flounder, sturgeon, koi, and/or any combination therein; b) a crustacean including but not limited to a prawn, shrimp, crab, and/or lobster; c) an invertebrate including but not limited to a sea cucumber, clam, mussel, abalone, and/or snail; d) and/or any combination there of In embodiments, the plant is: a) a crop including but not limited to lettuce, basil, cilantro, kale, thyme, various culinary and medicinal herbs, microgreens and/or any other vegetative plant; b) a fruiting and/or flowering plant including but not limited to a tomato, melon, pepper, cucumber, eggplant, strawberry, grape, and coffee; c) an aquatic plant such as but not limited to a mangrove, *salicornia*, and/or turtle grass; d) and/or any combination thereof.

In embodiments, the algae is: a) a freshwater microalgae species including but not limited to *Haematococcus, Chlorella, Chlaymydomonas, spirulina* and/or any combination thereof; b) a saltwater microalgae species including but not limited to *Nannochloropsis, Isochrysis, Chlamydomonas, Dunaliella* and or any combination thereof; c) a macroalgae species such as but not limited to *Caulerpa, Laminaria, Haliotis, Ulva, Sargassum, Macrocystis, Fucus, Porphyra,*

*Saccharina, Undaria*; d) a coral and/or any species comprised of an algae symbiont; e) and/or any combination thereof In embodiments, a nutrient solution is added to the system: a) when the nitrate concentration of the water within the system is below 50 milligrams per liter b) when the nitrate concentration of the water within the system is below 80 milligrams per liter; c) when the nitrate concentration of the water within the system is below 100 milligrams per liter; d) when the nitrate concentration of the water within the system is below 200 milligrams per liter; e) when the nitrate concentration of the water within the system is below 1,200 milligrams per liter.

In embodiments, a nutrient solution is added to the system: a) when the iron concentration of the water within the system is below 0.5 milligrams per liter; b) when the iron concentration of the water within the system is below 1.5 milligrams per liter; c) when the iron concentration of the water within the system is below 2.5 milligrams per liter; d) when the iron concentration of the water within the system is below 5.0 milligrams per liter.

In embodiments, a nutrient solution is added to the system: a) when the pH is below 6.0; b) when the pH is below 6.5; c) when the pH is below 6.8; d) when the pH is below 7.0; e) and/or when the pH is greater than 7.0.

In embodiments, a nutrient solution may be comprised of elements, compounds, enzymes, organics, biological, carbon and/or any combination thereof required for plant nutrition In embodiments, nutrient supplements are added: a) to the reservoir manually; b) to the reservoir through an automated process; c) to the hydroponic system(s) manually; d) to the agricultural system through irrigation systems commonly practiced in the art; e) to the algae system(s) manually; f) to the algae system through an automated process; g) and/or any other method of distributing liquid fertilizer mixtures; h) and/or any combination thereof. In one embodiment of the integrated multi-trophic farming system, an automated nutrient injection system(s) providing nutrients and supplements.

In one embodiment of the integrated multi-trophic farming system, the automated nutrient dosing system is controlled by a sensor and control package comprised of: a) pH; b) electrical conductivity; c) total suspended solids; d) total dissolved solids; e) turbidity; f) dissolved oxygen; g) redox potential; h) temperature; i) nitrate; j) ammonia; k) alkalinity; l) colorimeter; m) photometer; n) and/or any combination thereof.

In one embodiment of the integrated multi-trophic farming system, the dissolved oxygen levels are maintained above 6 milligrams per liter. In one embodiment of the integrated multi-trophic farming system, the dissolved oxygen levels are maintained above 4 milligrams per liter. In one embodiment of the integrated multi-trophic farming system, the dissolved oxygen levels are maintained above 2 milligrams per liter. In one embodiment of the integrated multi-trophic farming system, the dissolved oxygen levels are maintained as close to saturation levels between 7.0 milligrams per liter to 8.0 milligrams per liter. In one embodiment of the integrated multi-trophic farming system, the dissolved oxygen levels are maintained a hyper-oxygenated concentration greater than saturation levels ranging from 8 milligrams per liter to 20 milligrams per liter.

In one embodiment of the integrated multi-trophic farming system, the series of filtration processes is comprised of: a) a pressurized bead filter(s); b) a biological packed column filter(s); c) a reservoir; d) a micron-screen filter(s) and/or series of micron-screen filters.

In one embodiment of the integrated multi-trophic farming system, the series of filtration processes is comprised of: a) a packed column mechanical filter comprised of filtration floss and/or coconut coir matting; b) a packed column biological media filter comprising of plastic grate screening, bio-balls, and aeration on the bottom of the packed column filter; c) a reservoir; d) a micron-screen filter.

In one embodiment of the integrated multi-trophic farming system, the series of filtration processes is comprised of: a) a packed column mechanical and biological filter system of claim comprised of: 1) The mechanical filter portion is comprised of filtration floss and/or coconut coir matting; 2) the biological filter portion is comprised of plastic grate screening, bio-balls, and aeration on the bottom of the packed column filter; b) a reservoir; c) a micron-screen filter.

In one embodiment of the integrated multi-trophic farming system, the series of filtration processes is comprised of: a) a packed column mechanical and biological filter system comprised of: 1) the mechanical filter portion is comprised of filtration floss and/or coconut coir matting; 2) the biological filter portion is comprised of plastic grate screening, bio-balls, and aeration on the bottom of the packed column filter; b) a reservoir; c) a hydroclone filter.

In one embodiment of the integrated multi-trophic farming system, the series of filtration processes is comprised of: a) a packed column mechanical and biological filter system of claim comprised of: 1) the mechanical filter portion is comprised of filtration floss and/or coconut coir matting; 2) the biological filter portion is comprised of plastic grate screening, bio-balls, and aeration on the bottom of the packed column filter; b) a reservoir; c) a protein skimmer and/or foam fractionation unit.

In one embodiment of the integrated multi-trophic farming system, the series of filtration processes is comprised of: a) a packed column filter housing the (b.1) mechanical and the (b.2) biological filter; b) a (b.3) reservoir in the form of a settling trough; c) a (b.4) hydroclone filter.

In one embodiment of the integrated multi-trophic farming system, the series of filtration processes is comprised of: a) a packed column filter housing the (b.1) mechanical and the (b.2) biological filter; b) a (b.3) reservoir in the form of a settling trough; c) a (b.4) protein skimmer. In embodiments of the integrated multi-trophic farming system ozone may used injected into the venturi stream of the (b.4) protein skimmer.

In one embodiment of the integrated multi-trophic farming system, the series of filtration processes is comprised of: a) a (b.1) bead filter; b) a (b.2) packed column biological filter; c) a (b.3) reservoir in the form of a settling trough; d) a (b.4) hydroclone filter.

In one embodiment of the integrated multi-trophic farming system, the series of filtration processes is comprised of: a) a (b.1) bead filter; b) a (b.2) packed column biological filter; c) a (b.3) reservoir in the form of a settling trough; d) a (b.4) Protein Skimmer. In embodiments, ozone may be used and injected into the venturi stream of the (b.4) protein skimmer.

In one embodiment of the integrated multi-trophic farming system, the series of filtration processes is comprised of: a) a (b.1) bead filter; b) a (b.2) packed column biological filter; c) a (b.3) reservoir in the form of a settling trough; d) a (b.4) vortex filter.

In one embodiment of the integrated multi-trophic farming system, the series of filtration processes is comprised of: a) a packed column filter housing the (b.1) mechanical and the (b.2) biological filter; b) a (b.3) reservoir in the form of a settling trough; c) a (b.4) vortex filter.

In one embodiment of the integrated multi-trophic farming system, the series of filtration processes is comprised of: a) a (b.1) bead filter; b) a (b.2) packed column biological filter; c) a (b.3) reservoir in the form of a settling trough; d) a (b.4) rotating drum filter.

In one embodiment of the integrated multi-trophic farming system, the series of filtration processes is comprised of: a) a packed column filter housing the (b.1) mechanical and the (b.2) biological filter; b) a (b.3) reservoir in the form of a settling trough; c) a (b.4) rotating drum filter.

In one embodiment of the integrated multi-trophic farming system, the series of filtration processes is comprised of: a) a (b.1) rotating drum filter; b) a (b.2) packed column biological filter; c) a (b.3) reservoir in the form of a settling trough; d) a (b.4) rotating drum filter.

In one embodiment of the integrated multi-trophic farming system, the series of filtration processes is comprised of: a) a (b.1) rotating drum filter; b) a (b.2) packed column biological filter; c) a (b.3) reservoir in the form of a settling trough; d) a (b.4) protein skimmer. In embodiments, ozone may be used and injected into the venturi stream of the (b.4) protein skimmer.

In one embodiment of the integrated multi-trophic farming system, the series of filtration processes is comprised of: a) a (b.1) rotating drum filter; b) a (b.2) packed column biological filter; c) a (b.3) reservoir in the form of a settling trough; d) a (b.4) hydroclone filter.

In one embodiment of the integrated multi-trophic farming system of claim 1, the series of filtration processes is comprised of: a) a (b.1) rotating drum filter; b) a (b.2) packed column biological filter; c) a (b.3) reservoir in the form of a settling trough; d) a (b.4) vortex filter.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An integrated multi-trophic farming process comprising:
   withdrawing effluent from a fish and/or aquatic animal production system;
   serial filtering the fish and/or aquatic animal production system effluent;
   distributing the filtered fish and/or aquatic animal production system effluent to a hydroponic plant system, an algae production system and an agricultural system;
   withdrawing effluent from the hydroponic plant system and the algae production system and recycling a first portion of the effluent from the hydroponic plant system and the algae production system to the serial filtration system;
   distributing a second portion of the effluent from the hydroponic plant system and the algae production system to the agricultural system; and
   withdrawing effluent from the agricultural system.

2. The integrated multi-trophic farming process of claim 1, further comprising measuring nitrate concentration of the filtered fish and/or aquatic animal production system effluent.

3. The integrated multi-trophic farming process of claim 1, measuring iron concentration of the filtered fish and/or aquatic animal production system effluent.

4. The integrated multi-trophic farming process of claim 1, further comprising measuring pH of the filtered fish and/or aquatic animal production system effluent.

5. The integrated multi-trophic farming process of claim 1, further comprising injecting a nutrient solution into a reservoir.

6. The integrated multi-trophic farming process of claim 1, further comprising injecting a nutrient solution into the hydroponic plant system.

7. The integrated multi-trophic farming process of claim 1, further comprising injecting a nutrient solution into the algae production system.

8. The integrated multi-trophic farming process of claim 5, wherein the nutrient solution is injected manually.

9. The integrated multi-trophic farming process of claim 5, wherein the nutrient solution is injected automatically.

* * * * *